United States Patent [19]

Gottlieb et al.

[11] Patent Number: 4,575,186

[45] Date of Patent: Mar. 11, 1986

[54] METHOD AND APPARATUS FOR THE SPECTRAL RANGE ENLARGEMENT OF ACOUSTO-OPTIC TUNABLE FILTERS

[75] Inventors: Milton Gottlieb, Churchill; John J. Conroy, Penn Hills, both of Pa.

[73] Assignee: Westinghouse Electric Corp., Pittsburgh, Pa.

[21] Appl. No.: 417,965

[22] Filed: Sep. 14, 1982

[51] Int. Cl.[4] ................................................ G02F 1/11
[52] U.S. Cl. .................................................... 350/358
[58] Field of Search ......................................... 350/358

[56] References Cited

U.S. PATENT DOCUMENTS 3,459,603  9/1973  Eschler ............................... 350/358

Primary Examiner—John K. Corbin
Assistant Examiner—Vincent J. Lemmo
Attorney, Agent, or Firm—Thomas R. Trempus

[57] ABSTRACT

The invention relates to a method and an apparatus for enlarging the spectral range of an acousto-optic tunable filter by extending the operation of the transducer structure to its third harmonic. The transducer structure consists of a plurality of individual transducer elements in electrical communication through a switching network which modifies the total capacitance of the transducer structure to provide a satisfactory impedance match at both the fundamental and the third harmonic.

6 Claims, 6 Drawing Figures

METHOD AND APPARATUS FOR THE SPECTRAL RANGE ENLARGEMENT OF ACOUSTO-OPTIC TUNABLE FILTERS

GOVERNMENT CONTRACT CLAUSE

The U.S. Government has rights in this invention pursuant to Contract No. F-1067 awarded by the U.S. Air Force.

BACKGROUND OF THE INVENTION

The present invention relates to infrared analyzers which can be used in a variety of industrial and commercial applications. In particular the present invention is a method and an apparatus for enlarging the spectral range of an acousto-optic tunable filter by extending the operation of the transducer structure to its third harmonic.

It has been known to utilize plural acoustic transducers in an acousto-optic tunable filter system in order to increase the spectral range of the system. For example, U.S. Pat. No. 3,759,603 teaches a system with a plurality of transducers, each of which is operable in consecutive frequency ranges to increase the system pass band. U.S. Pat. No. 3,665,204 teaches an acousto-optic device which utilizes a contribution to light output from the second order harmonic. Finally, U.S. Pat. No. 3,807,799 offers a general teaching of utilizing higher order spectra to contribute to total light output through the provision of additional slit openings in an output slit diaphragm for an acousto-optic device.

It is therefore an object of this invention to provide an acousto-optic tunable filter in which the range is extended by utilizing the third harmonic frequency band of the transducer structure.

It is also an object of this invention to provide a transducer structure in which the capacity may be electronically switched so that the electrical impedance match is held approximately constant over the extended frequency range.

It is still another object of this invention to provide a method of operating an acousto-optic tunable filter with an extended spectral range so that the filter efficiency at the third harmonic band is generally equivalent to the filter efficiency at the fundamental band.

SUMMARY OF THE INVENTION

The invention provides a method for enlarging the spectral range of an acousto-optic device by extending the operation of the transducer structure to the third harmonic of the fundamental frequency. A transducer structure is coupled to a crystal employed as a sonic medium. The transducer structure consists of a plurality of individual transducer elements. A switching means is provided for selectively establishing electrical communication among the elements so that the capacitance of the transducer structure can be modified. By modifying the capacitance of the transducer structure, an RF generator can alternately provide both a fundamental frequency and the third harmonic of that frequency to a transducer structure with adequate impedance matching characteristics throughout.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE PREFERRED EMBODIMENT

Figure 1:
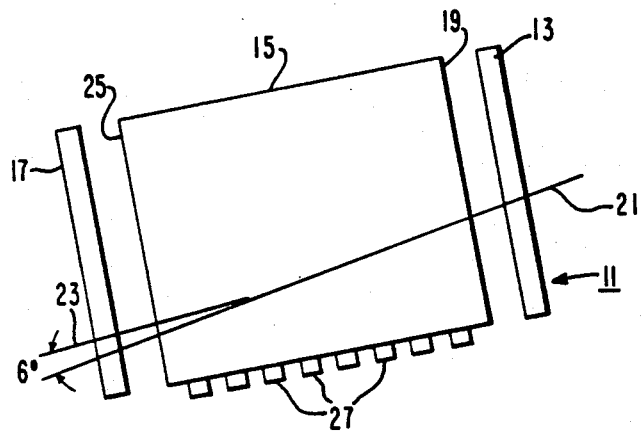
FIG. 1 is a somewhat schematical representation of an acousto-optic tunable filter.

An acousto-optic tunable filter operates through the interaction of high frequency acoustic waves with light waves in a suitable crystal. A typical configuration of an acousto-optic tunable filter is schematically illustrated in FIG. 1 and generally indicated by the reference character 11. The acousto-optic tunable filter (AOTF) 11 comprises an input polarizer 13, an acousto-optic crystal 15 and an output polarizer 17. The present material of choice for the AOTF crystal is thallium arsenic selenide, $Tl_3AsSe_3$, which is disclosed in U.S. Pat. No. 3,792,287 which is assigned to the assignee of the present invention. The input optical face 19 of the crystal 15 is cut so as to be normal to the incident infrared beam 21. The filtered output beam 23 is diffracted at an angle of about 6° to the incident beam 21 and the exit optical face 25 of the crystal 15 is cut so as to be normal to this output beam 23. An acoustic transducer according to this invention comprises a plurality of transducer elements 27 mated to one of the opposed side surfaces of the crystal 15. Each element 27 of the transducer can, for example, consist of an X-cut lithium niobate crystal plate which is efficiently coupled to the crystal 15. A conductive electrode pattern is provided on the lithium niobate transducer, and this electrode is driven by a controllable RF signal.

The acoustic energy from the transducer elements 27 is propagated so as to be nearly normal to the optical beam propagation direction. When RF power is applied to the transducer, the polarized input infrared radiation is propagated along a path at a predetermined angle to the optic axis of the crystal and a narrow pass band frequency selectively interacts with the acoustic wave. The polarization is rotated 90 degrees from the polarization of the unfiltered beam. This selected or tuned narrow pass band infrared radiation is also distinguishable from the remaining input radiation because it is shifted or diffracted at a small angle relative to the unaffected input radiation path, such as the 6 degree offset described above. Thus the filtered light can be separated either spatially due to this offset angle without the use of an output polarizer, or by means of an output polarizer.

The frequency of the RF signal driving the transducer elements 27 determines the wavelength of light that is passed by the AOTF crystal 15. For any AOTF material and configuration, there is a relationship that uniquely determines the pass wavelength:

$\lambda = F/f$ where $\lambda$ is the pass wavelength, f is the acoustic frequency and F is a function of the crystal material constants and configuration angles. While it is desirable that acousto-optic tunable filters be capable of operation over a large range of optical wavelength, these filters are limited by the bandwidth of the acoustic transducer structure. Accordingly, the acoustic transducer structure is designed and fabricated with as large a bandwidth as possible, consistent with efficient electromechanical transduction. For typical AOTF designs, this bandwidth is generally no larger than about 80% of the center frequency, $f_o$; that is:

$$\Delta f/f_o = 0.8$$

Another important characteristic of the AOTF is the efficiency with which the selected wavelength is passed by the filter. This characteristic is a function of the acoustic power level and the wavelength itself. In order to achieve a given efficiency, the required RF power increases as $\lambda^2$. Thus, the required power over a range of operation will be determined by the product of the transducer response with $\lambda^2$, as follows:

$$P(RF) \sim \lambda^2/(\text{transducer response})$$

The present invention increases the AOTF spectral range by providing a transducer structure to operate over an enlarged bandwidth. The AOTF operates both at its fundamental frequency mode and also at its third harmonic frequency mode. As a result, the AOTF transducer frequency range may extend from the lowest frequency in the fundamental band to the highest frequency in the third harmonic band. Third harmonic operation of transducers results in a much lower electromechanical conversion efficiency than operation at the fundamental frequency, typically about ten times lower. On the other hand, the third harmonic band corresponds to filtered wavelengths three times shorter than the fundamental band. The acoustic power requirement for the third harmonic band is thus only one-ninth that of the fundamental band. As a result, these two effects tend to balance each other, yielding essentially flat optical transmission over the extended range.

Figure 2:
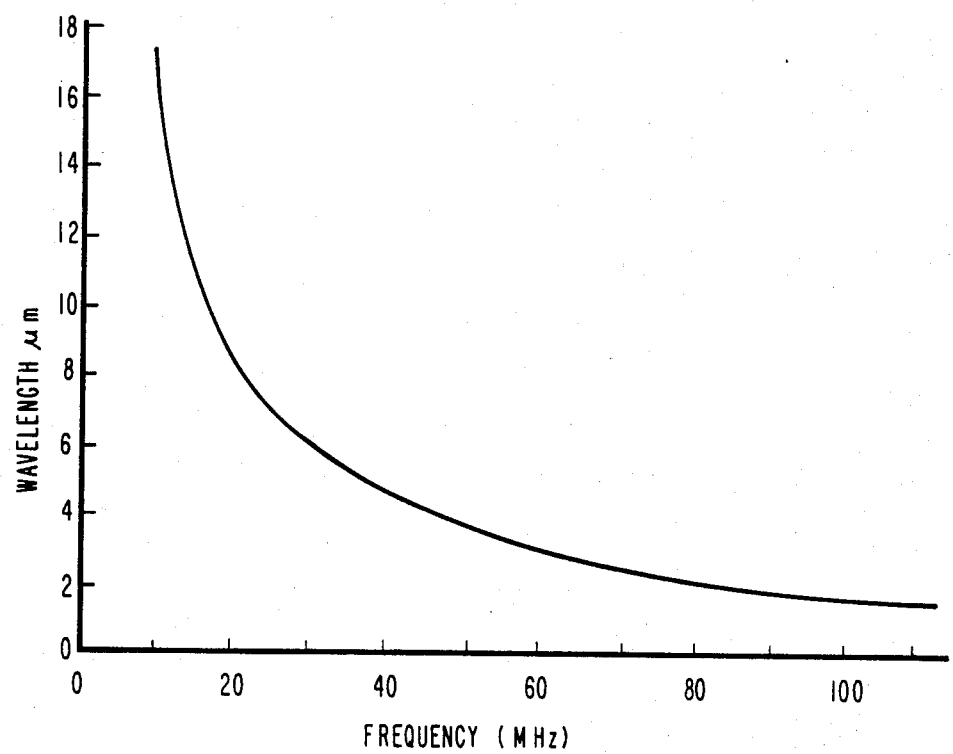
FIG. 2 is a graph illustrating a tuning curve for a $Tl_3AsSe_3$ crystal, acousto-optic tunable filter.
Figure 3:
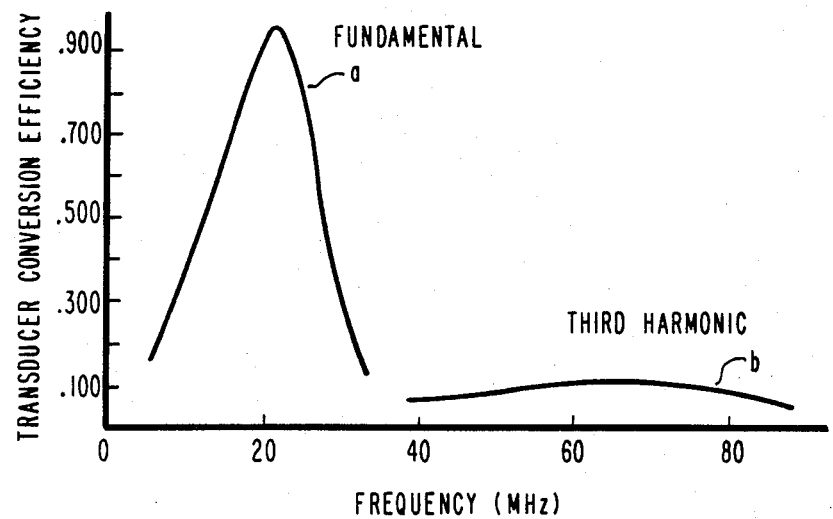
FIG. 3 is a graph illustrating transducer conversion efficiency at the fundamental frequency and the third harmonic in a transducer of fixed capacity.

A tuning curve for a $Tl_3AsSe_3$ crystal, noncollinear AOTF is shown in FIG. 2. In order to employ this AOTF in the spectral range of about 1.5 to 17 micrometers, it is necessary to apply RF power in the range of 10 MHz to 110 MHz. This frequency range corresponds to about $3\frac{1}{3}$ octaves. Conventional transducer technology is inadequate for such an application. The optimum bandwidth on a $Tl_3AsSe_3$ crystal AOTF is approximately 80% of the center frequency which is selected to be 26 MHz. Plot 'a' on the graph of FIG. 3 represents the conversion efficiency obtained with a AOTF crystal having a transducer of predetermined fixed capacitive value driven at 26 MHz according to the conventional practice described above. It is possible to operate acoustic transducers on the third harmonic of their fundamental band under this practice. However, as shown by plot 'b' on the graph of FIG. 3, a significantly lower electro-mechanical conversion efficiency is obtained. While the conversion efficiency in the third harmonic band depends upon a number of factors, it will typically be around a factor of 10 lower than the conversion efficiency at the fundamental band. As described above, the AOTF interaction efficiency varies as $\lambda^{-2}$, so that the overall filter efficiency varies as $$1/\lambda^2$$

transducer response). The transducer response is a function of the electromechanical conversion efficiency of the transducer and also upon the electrical matching of the transducer to the driving circuit.

The transducer is an electrically capacitive load whose value depends upon the physical structure of the transducer, i.e., transducer thickness, transducer area and the dielectric constant of the transducer material. A problem that arises with large area transducers, or even with small area transducers at very high frequencies, is matching the electrical impedance to the impedance of the RF source. This problem is overcome by dividing the transducer into a multielement array of series connected components. The overall capacitance for fixed transducer dimensions can be determined by the number of elements in the array. Accordingly, if there are N elements in the array, the capacity of the transducer is $C/N^2$ where C is the capacity of the undivided transducer.

A method for forming a series of transducer elements on a crystal is disclosed in U.S. patent application Ser. No. 403,954, which is assigned to the assignee of the present application and is incorporated herein by reference thereto.

Figure 4A:
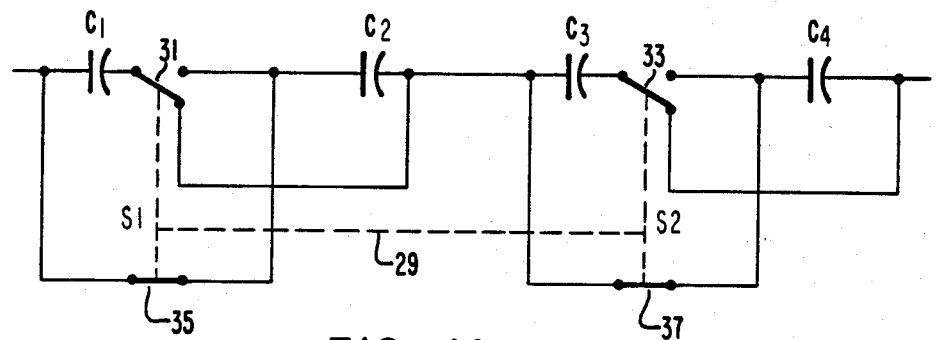
FIGS. 4A and 4B schematically illustrate a transducer switching apparatus according to this invention.
Figure 4B:
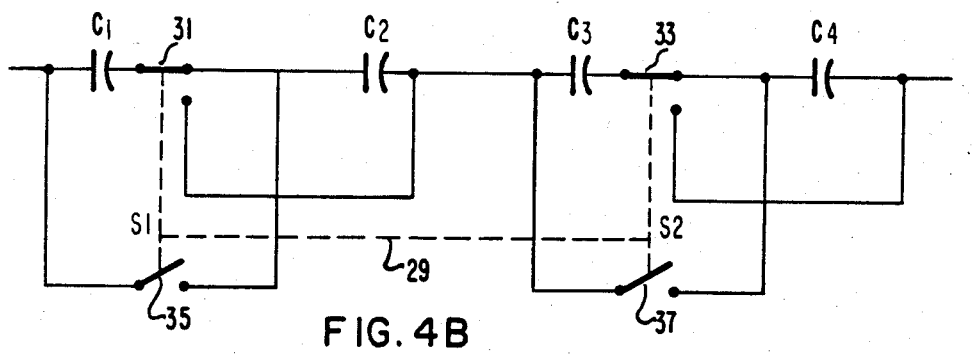

While a transducer structure can be formed to provide impedance matching characteristics which optimize matching in the fundamental band, these same characteristics fail to provide acceptable impedance matching characteristics for the operation of the AOTF in the third harmonic of the fundamental band. This invention overcomes this problem by controlling the number of transducer elements driven by the RF source according to which frequency band is operated. A schematical representation of the transducer structure of this invention is illustrated in FIGS. 4A and 4B. Each individual transducer element 27 of the transducer structure is schematically shown as a capacitor and designated $C_1$ through $C_4$ ($C_1 = C_2 \ldots C_N$). While only four capacitors are shown, representing a four element transducer structure is to be understood that transducer structure consisting of more than four individual transducer elements can incorporate the features of this invention (FIG. 1, for example, shows an eight element transducer structure). Moreover, while the switching means S1 and S2 of this invention are shown as having mechanical linkage 29, any of a variety of switching devices can be incorporated into the circuitry of this invention. As shown in both FIGS. 4A and 4B, the switches are ganged and operated in unison.

In FIG. 4A, switch means S1 and S2 are placed in a first position in which contacts 31 and 33 are in a first closed position and contacts 35 and 37 are closed. With the switches S1 and S2 in the first position, the pair of elements $C_1$ and $C_2$ are in a parallel electrical configuration as are the pair of elements $C_3$ and $C_4$. The pairs of elements, defining parallel groups, are electrically connected in series. This combination of parallel pairs or groups of elements in series permits operation in the fundamental band because the capacity is equal to $4C/N^2$ as described above.

In FIG. 4B, the switching means S1 and S2 are shown in a second position in which contacts 31 and 33 are in a second closed position and contacts 35 and 37 are opened. This configuration places the transducer elements $C_1$ through $C_4$ in series electrical connection and permits the satisfactory impedance matching of the transducer elements with an RF source operating at the third harmonic band of the fundamental frequency.

Ideally, the capacity of the third harmonic should be one-third the capacity of the fundamental. The present transducer element switching system, however, yields a factor of one-fourth between the elements when switched from the fundamental to the third harmonic. While the impedance match between the transducer elements and the RF driven is not precisely achieved for the third harmonic, the impedance match is such that greatly improved performance over a full range of both the fundamental and the third harmonic is obtained.

Figure 5:
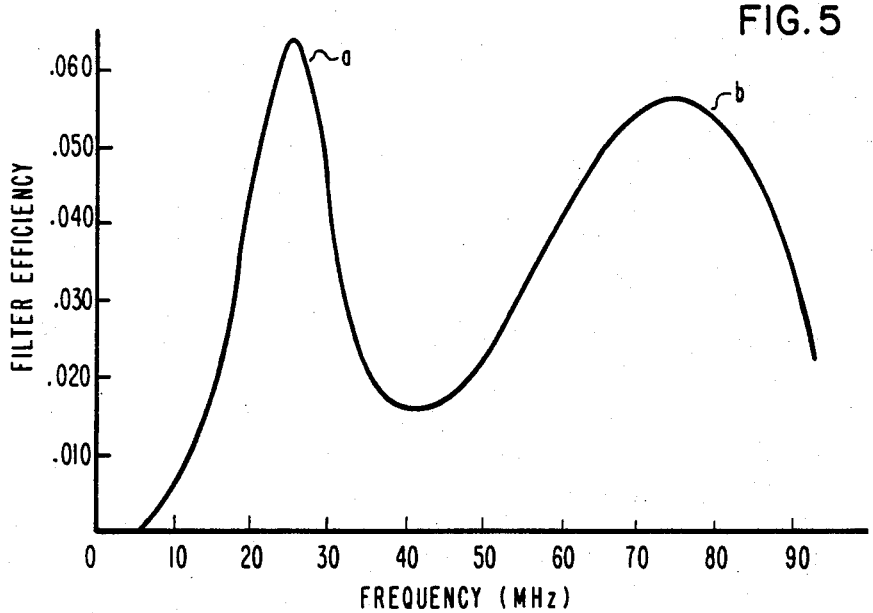
FIG. 5 is a graph illustrating transducer conversion efficiency at the fundamental frequency and the third harmonic in an acousto-optic tunable filter according to the teachings of this invention.

The two plots of the graph in FIG. 5 illustrate the conversion efficiency obtained in an AOTF utilizing the switching means of this invention and operating at both the fundamental frequency as at 'a' and the third harmonic thereof as at 'b'. A reasonably flat efficiency is obtained in the long wavelength region. The present invention greatly extends the operational range with a transducer structure of limited bandwidth.

By utilizing the principles of this invention, the spectral range of an acousto-optic tunable filter system can be extended to include the third harmonic frequency band of the transducer structure. More particularly, the spectral range is extended by designing the transducer structure so that the fundamental plus third harmonic bands correspond to the desired continuous spectral range.

What has been described is an acousto-optic tunable filter with a transducer structure having a capacity which may be electronically switched to match the frequency band of operation. As a result, the electrical impedance is held approximately constant over the extended frequency range.

What is claimed is:

1. A method for operating an acousto-optic device including a crystal employed as a sonic medium, a transducer structure, having individually electrically interconnected transducer elements displaying a first degree of capacity coupled thereto and an RF source in communication with the transducer structure comprising the steps of:
    aplying a fundamental frequency from said RF source to said transducer structure exhibiting the first degree of capacity;
    modifying the electrical interconnection of the transducer elements of said transducer structure to exhibit a second degree of capacity;
    applying a third harmonic of said fundamental frequency from said RF source to the modified transducer structure;
    returning said transducer structure to said first degree of capacity; and
    applying said fundamental frequency from said RF source to said transducer structure.

2. The method for operating an acousto-optic device according to claim 1 including the step of alternately modifying said transducer structure between the first and second degree of capacity and the fundamental and third harmonic thereof respectively, wherein the spectral range is extended from the lowest frequency in the fundamental band to the highest frequency in the third harmonic band.

3. An acousto-optic device comprising:
    a crystal employed as a sonic medium;
    a transducer structure coupled to said crystal for launching acoustic waves into said crystal, said transducer structure having a plurality of individual transducer elements with a predetermined individual capacitance; and
    switching means for selectively establishing electrical communication among said transducer elements; wherein for a first selected position of said switching means, said transducer structure presents a first degree of total capacitance compatible with a predetermined RF frequency and for a second selected position of said switching means, said transducer structure presents a second degree of total capacitance compatible to a third harmonic of said predetermined frequency;
    wherein said first selected position of said switching means aligns said transducer elements such that pairs of elements are electrically connected in parallel groups and said parallel groups are electrically connected in series, and wherein said second selected position of said switching means aligns said transducer elements in a series electrical connection, whereby the total capacitance of said transducer structure is less when said switching means is in said second position than when said switching means is in said first position.

4. The acousto-optic device of claim 3 including an RF source coupled to the transducer structure, said RF source selectively providing the fundamental frequency and the third harmonic thereof to said transducer structure wherein the capacitance of the transducer structure is modified by the switching means to provide effective impedance matching between said RF source and said transducer structure.

5. The acoustic-optic device of claim 4 wherein the crystal employed as a sonic medium is a crystal with the formula $Tl_3AsSe_3$.

6. The acoustic-optic device of claim 4 wherein the capacitance of the transducer structure established by the switching means in the second selected position is one-fourth the capacitance of the transducer structure established by the switching means in the first selected position and wherein the capacitance in the first selected position provides effective impedance matching with the RF source generating the fundamental frequency, and the capacitance in the second selected position provides effective impedance matching with the RF source generating the third harmonic of the fundamental frequency.

* * * * *